United States Patent [19]

White, III et al.

[11] Patent Number: 5,547,998

[45] Date of Patent: Aug. 20, 1996

[54] INSULATING RIGID POLYURETHANE FOAM COMPOSITIONS

[75] Inventors: Walter R. White, III, Trenton; James A. Mullins, Wyandotte, both of Mich.

[73] Assignee: BASF Corporation, Mount Olive, N.J.

[21] Appl. No.: 551,507

[22] Filed: Nov. 1, 1995

[51] Int. Cl.$^6$ .................................................. C08G 18/18
[52] U.S. Cl. ..................................... 521/131; 252/182.26
[58] Field of Search ......................... 521/131; 252/182.26

[56] References Cited

U.S. PATENT DOCUMENTS 5,391,317  2/1995  Smits ..................................... 521/131

FOREIGN PATENT DOCUMENTS

WO94/03515  10/1994  WIPO.

OTHER PUBLICATIONS

"An Insight Into the Characteristics of a Nucleation Catalyst in CFC–Free Rigid Foam Systems", 35th Annual Polyurethane Technical/Marketing Conference, Oct. 9–12, 1994, by H. Yoshimura, Y. Tamano, S. Okuzono, D. Lowe, pp. 300–310.

Primary Examiner—Morton Foelak
Attorney, Agent, or Firm—Dennis V. Carmen

[57] ABSTRACT

There is now provided storage stable polyol compositions and polyisocyanate based rigid dosed cell foam made by reacting an organic isocyanate with polyol compositions in the presence of a blowing agent, where the polyol composition contains at least:

a) an aromatic amine initiated polyoxyalkylene polyether polyol having an hydroxyl number of 200 meq polyol/g KOH or more;

b) an aliphatic amine initiated polyoxyalkylene polyether polyol having an hydroxyl number of 200 meq polyol/g KOH or more;

and the blowing agent is at least cyclopentane in an amount of 7 weight percent or more based on the weight of the polyol composition; and further, the cyclopentane blowing agent is soluble in the polyol composition, and the amount of the aliphatic amine initiated polyoxyalkylene polyether polyol is 10 weight percent or less based on the weight of the polyol composition.

The polyol composition is adapted to solubilize cyclopentane in the polyol composition without sacrificing, and advantageously improving, the thermal insulation and dimensional stability of the resulting polyurethane foam. It was surprising to discover that less than 10 weight percent of the aliphatic amine initiated polyol was need to accomplish these objectives, and it was further surprising to discover that the aromatic amine initiated polyether polyol improved the thermal insulation of the foam.

16 Claims, No Drawings

INSULATING RIGID POLYURETHANE FOAM COMPOSITIONS

FIELD OF THE INVENTION

This invention pertains to rigid closed cell polyurethane foams blown with cyclopentane. More specifically, the invention pertains to using a polyol composition in which cyclopentane is soluble. The polyol composition is made up of at least an aromatic amine initiated polyoxyalkylene polyether polyol and 10 weight percent or less of an aliphatic amine initiated polyoxyalkylene polyether polyol.

BACKGROUND OF THE INVENTION

Hydrocarbons are gaining wider acceptance as viable alternative blowing agents in the manufacture of rigid polyurethane foams. Due to the non-polar hydrophobic characteristic of hydrocarbons, they are only partially soluble, if not completely insoluble, in many polyols used to manufacture rigid polyurethane foams. The insolubility or poor shelf life of hydrocarbon-polyol mixtures has, to date, restricted one against storing batches of polyol and cyclopentane mixtures for use at a later time. Due to the poor solubility of cyclopentane in polyols, it must be added to the polyols under constant agitation and immediately before dispensing the foaming ingredients through a mixhead. The insolubility of cyclopentane also tends to lead to larger, coarser, or uneven cell structures in a polyurethane foam. As is well known, the thermal conductivity of a foam generally increases with a poor cell structure. Therefore, it is critical that cyclopentane be uniformly dispersed under constant agitation throughout the polyol mixture immediately prior to foaming in order to obtain a rigid polyurethane foam having the desired thermal insulation values.

In U.S. Pat. No. 5,391,317, Smits sought to manufacture a foam having both good dimensional stability and thermal insulation using hydrocarbons as blowing agents. This reference taught the use of a particular mixture of $C_{5-6}$ alicyclic alkanes, isopentane and n-pentane blowing agents in particular molar percents, in combination with a polyol mixture made up of an aromatic initiated polyether polyol, an aromatic polyester polyol, and a different amine initiated polyether polyol. As the aromatic initiated polyether polyol, Smits suggested using an alkylene oxide adduct of a phenol-formaldehyde resin. The particular mixture of alicyclic and isomeric aliphatic alkane blowing agents is taught by Smits as producing a foam having good thermal insulation values.

The problem of obtaining a closed cell rigid polyurethane foam having both good dimensional stability and thermal insulation at low densities was also discussed in "An Insight Into The Characteristics of a Nucleation Catalyst in HCFC-Free Rigid Foam Systems" by Yoshimura et al. This publication reported the results of evaluations on a host of catalysts used in a standard polyurethane formulation to test the effects of each catalyst on the thermal insulation and dimensional stability of the foam. The standard formulation used contained 40 parts by weight of a sucrose-based polyether polyol, 30 parts by weight of an aromatic amine initiated polyether polyol, and 30 parts by weight of an aliphatic amine initiated polyether polyol, corresponding to a 1:1 weight ratio of aromatic to aliphatic amine initiated polyols. This formulation was selected based upon the findings that sucrose and aromatic amine-based polyether polyols exhibited poor solubilities with cyclopentane, while aliphatic amine-based polyether polyols provided the best solubility of cyclopentane. As a result, 30 parts by weight of the aliphatic amine-initiated polyether polyol was used in the standard formulation. The authors of this article also found that, as the aliphatic amine-initiated polyether polyol content was decreased from 30 parts by weight to 15 parts by weight and further down to 5 parts by weight, the solubility of cyclopentane in the polyols was so reduced that it formed an emulsion, as disclosed in Table 5. In describing this effect, the authors noted that the solubility of cyclopentane in the polyol composition was reduced by increasing the blending ratio of aromatic amine-based polyols. Furthermore, not only did the authors note that the solubility of cyclopentane in the polyols was reduced as the aliphatic amine-initiated polyether polyol content was reduced and the aromatic amine-initiated polyether polyol was increased, but also noted that no significant effect in thermal conductivity was observed when the aromatic amine-initiated polyether polyol content was increased.

SUMMARY OF THE INVENTION

It would be highly desirable to provide a polyol composition in which cyclopentane is soluble, as well as making a dimensionally stable rigid closed cell polyurethane foam from such polyol composition having good thermal insulation properties.

There is now provided a storage stable polyol composition comprising:

a) an aromatic amine initiated polyoxyalkylene polyether polyol having an hydroxyl number of 200 meq polyol/g KOH or more;

b) an aliphatic amine initiated polyoxyalkylene polyether polyol having an hydroxyl number of 200 meq polyol/g KOH or more in an amount of 10 weight percent or less based on the weight of the polyol composition; and c) cyclopentane;

wherein the cyclopentane is dissolved and solubilized in the polyol composition. In a preferred embodiment, the amount of cyclopentane is 7 weight percent or more based on the weight of the polyol composition. The cyclopentane is soluble in the polyols used in the polyol composition.

There is also provided a polyisocyanate based rigid closed cell foam made by reacting an organic isocyanate with a polyol composition in the presence of a blowing agent, where the polyol composition contains at least:

a) an aromatic amine initiated polyoxyalkylene polyether polyol having an hydroxyl number of 200 meq polyol/g KOH or more;

b) an aliphatic amine initiated polyoxyalkylene polyether polyol having an hydroxyl number of 200 meq polyol/g KOH or more, in an amount of 10 weight percent or less based on the weight of the polyol composition;

and the blowing agent is at least cyclopentane in an amount of 7 weight percent or more based on the weight of the polyol composition. By employing these ingredients in the polyol composition, the cyclopentane blowing agent is soluble in the polyol composition. There is also provided a polyurethane foam where the polyol composition contains solubilized cyclopentane.

The polyol composition is adapted to solubilize cyclopentane in the polyol composition without sacrificing, and advantageously improving, the thermal insulation and dimensional stability of the resulting polyurethane foam. Contrary to the results reported by Yoshimoto et al., it was surprising to discover that only less than 10 weight percent of the aliphatic amine initiated polyol was need to accomplish these objectives, that is, solubilize cyclopentane without forming an emulsion. It was further surprising to discover, contrary to what Yoshimoto et al found, that the aromatic amine initiated polyether polyol used in the invention impacted the thermal insulation of the foam.

There is also provided a method of making a polyisocyanate based rigid closed cell foam by reacting an organic isocyanate with a polyol composition into which is dissolved, rather than emulsified, cyclopentane in at least 7 weight percent or more based on the weight of the polyol composition, and further containing at least:

a) an aromatic amine initiated polyoxyalkylene polyether polyol having an hydroxyl number of 200 meq polyol/g KOH or more;

b) an aliphatic amine initiated polyoxyalkylene polyether polyol having an hydroxyl number of 200 meq polyol/g KOH or more, in an amount of 10 weight percent or less based on the weight of the polyol composition.

DETAILED DESCRIPTION OF THE INVENTION

There is provided a storage stable polyol composition made up of at least cyclopentane as a blowing agent and the polyol composition described herein. A polyol composition is deemed "storage stable" or "soluble" when the polyol composition has the capacity of retaining cyclopentane in solution or in a dissolved state for a period of at least 5 days. The determination of whether or not cyclopentane is in solution or dissolved is measured by mixing cyclopentane with the polyol composition ingredients in a clear glass jar, capping the jar, and letting the contents remain still for 5 days at room temperature without agitation. If upon visual inspection there is no phase separation such that two discrete layers are formed, the cyclopentane is deemed soluble in the polyol composition, and the polyol composition is deemed storage stable.

This test which lasts at least five (5) days is for only for purposes of measuring whether a particular polyol composition formulation is adequate to solubilize the cyclopentane blowing agent. As discussed further below, cyclopentane may be added to the polyol composition weeks prior to foaming, seconds prior to foaming, or right at the mix head. The scope of the invention includes each of these embodiments. By stating that the cyclopentane is soluble in the polyol composition is meant that the polyol composition employed must be capable of solubilizing cyclopentane, and is neither limited to a specific point in the process at which the cyclopentane is solubilized nor to a time period such as the five days used for purposes of measuring the capacity of the polyol composition for dissolving cyclopentane.

Where it is said that the polyol composition "contains" a blowing agent such as cyclopentane or that the cyclopentane blowing agent is "dissolved in" or "in solution" with the polyol composition, this would include those embodiments where cyclopentane is mixed with the other polyol composition ingredients for a period of time sufficient to dissolve the cyclopentane in the polyol composition prior to introducing the polyol composition into the mix head for reaction with an organic isocyanate compound, and would not include those embodiments where cyclopentane is metered as a separate stream into a dispensing head for reaction with an organic isocyanate.

The polyol composition contains polyols comprising at least the above mentioned a) and b) polyols. Other ingredients that may be included in the polyol composition are other polyols, catalysts, surfactants, blowing agents, fillers, stabilizers, and other additives. As used in this specification and in the claims, the term "polyol(s)" includes polyols having hydroxyl, thiol, and/or amine functionalities. The term "polyol(s)" as used herein, however, is limited to compounds containing at least some polyester or polyoxyalkylene groups, and having a number average molecular weight of 200 or more. Where the word "polyol(s)" is used in conjunction with and to modify the words polyether, polyester, or polyoxyalkylene polyether, the word "polyol" is then meant to define a polyhydroxy functional polyether.

Both the a) and b) polyols are polyoxyalkylene polyether polyols. These polyols may generally be prepared by polymerizing alkylene oxides with polyhydric amines. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide.

Included among the polyether polyols are polyoxyethylene polyols, polyoxypropylene polyols, polyoxybutylene polyols, polytetramethylene polyols, and block copolymers, for example combinations of polyoxypropylene and polyoxyethylene poly-1,2-oxybutylene and polyoxyethylene polyols, poly-1,4-tetramethylene and polyoxyethylene polyols, and copolymer polyols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. The alkylene oxides may be added to the initiator, individually, sequentially one after the other to form blocks, or in mixture to form a heteric polyether. The polyoxyalkylene polyether polyols may have either primary or secondary hydroxyl groups. It is preferred that at least one of the amine initiated polyols, more preferably both the a) and b) polyols, are polyether polyols terminated with a secondary hydroxyl group through addition of, for example, propylene oxide as the terminal block. It is preferred that one or both of the a) and b) amine initiated polyols contain 50 weight percent or more, and up to 100 weight percent, of secondary hydroxyl group forming alkylene oxides, such as polyoxypropylene groups, based on the weight of all oxyalkylene groups. This amount can be measured by adding 50 weight percent or more of the secondary hydroxyl group forming alkylene oxides to the initiator molecule in the course of manufacturing the polyol.

Suitable initiator molecules for the a) and b) compounds are primary or secondary amines. These would include, for the a) aromatic amine initiated polyether polyol, the aromatic amines such as aniline, N-alkylphenylene-diamines, 2,4'-, 2,2'-, and 4,4'-methylenedianiline, 2,6- or 2,4-toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes, with preference given to vicinal toluenediamines.

For the aliphatic amine initiated b) polyol, any aliphatic amine, whether branched or unbranched, substituted or unsubstituted, saturated or unsaturated, may be used. These would include, as examples, mono-, di, and trialkanolamines, such as monoethanolamine, methylamine, triisopropanolamine; and polyamines such as ethylene diamine, propylene diamine, diethylenetriamine; or 1,3-diaminopropane, 1,3-diaminobutane, and 1,4-diaminobutane. Preferable aliphatic amines include any of the diamines and triamines, most preferably, the diamines.

In one embodiment of the invention, each of the a) and b) polyols have number average molecular weights of 200–750 and nominal functionalities of 3 or more. By a nominal functionality is meant the functionality expected based upon the functionality of the initiator molecule, rather than the actual functionality of the final polyether after manufacture.

The amine initiated polyols a) and b) have hydroxyl numbers of 200 or more meq polyol/g KOH. At hydroxyl numbers of less than 200, the dimensional stability of the foam begins to deteriorate. I believe that the optimum nominal functionality of each amine initiated polyol is 4 or more, with hydroxyl numbers of 400 or more.

The overall amount of aliphatic amine initiated polyether polyol b) is 10 weight percent or less, based on the overall weight of all ingredients in the polyol composition. In another embodiment, the weight ratio of the aromatic amine initiated polyol a) to the aliphatic initiated polyol b) is 4:1 or greater, more preferably in the range of 7:1 to 11:1. We have found that the aromatic amine a) polyol improves the thermal insulation of the foam over a foam made without the a) polyol. Therefore, it is desirable to add as much of the polyol a) into the polyol composition as possible. However, it was originally expected that either a higher proportion of the aromatic amine a) polyol compared to the aliphatic amine b) polyol, or a low overall amount of the b) polyol in the polyol composition, would prevent cyclopentane from solubilizing in the polyol composition, which in turn would significantly set back the improvements in thermal insulation gained through the addition of aromatic amine initiated polyether polyol as well as promote greater foam shrinkage. It was quite unexpected to find that cyclopentane was soluble in a polyol composition containing low overall amounts of 10 weight percent or less aliphatic amine initiated polyether polyol b), and that the resulting foam product was both dimensionally stable and possessed excellent thermal insulation values.

The scope of the invention broadly includes a polyol composition containing the a) and b) polyols combined together in a mixture by separately manufacturing each individual polyether polyol, and subsequently combining the resulting polyether polyols together into a mixture; or by a co-initiation method where the aromatic amine and the aliphatic amine initiators are first blended together, after which the alkylene oxide(s) are added and reacted onto the initiator blend. The latter method is the preferred method. In the latter method, the amount of aliphatic amine initiated polyether polyol in the polyol composition would be calculated based on the percentage of the aliphatic initiator in the initiator blend multiplied by the percentage of the polyether polyol (resulting from addition of the alkylene oxide onto the initiator blend) in the polyol composition.

Other polyols besides the a) and b) polyols can and preferably are added to the polyol composition. These would include polythioether polyols, polyester amides and polyacetals containing hydroxyl groups, aliphatic polycarbonates containing hydroxyl groups, amine terminated polyoxyalkylene polyethers, polyester polyols, other polyoxyalkylene polyether polyols, and graft dispersion polyols. In addition, mixtures of at least two of the aforesaid polyols can be used. The preferable additional polyols are polyoxyalkylene polyether polyols and/or polyester polyols.

The additional polyoxyalkylene polyether polyols besides the a) and b) polyols include those initiated with polyhydroxyl compounds. Examples of such initiators are trimethylolpropane, glycerine, sucrose, sorbitol, propylene glycol, dipropylene glycol, pentaerythritol, and 2,2-bis(4-hydroxyphenyl)propane and blends thereof. The preferred polyols are initiated with polyhydroxyl compounds having at least 4 sites reactive with alkylene oxides, and further may be oxyalkylated solely with propylene oxide. In a more preferred embodiment, the additional polyol is a polyoxyalkylene polyether polyol having a nominal functionality of 5 or more, which may be initiated with a polyhydroxyl compound. The high functionality serves to increase the crosslink density to provide a dimensionally stable foam.

Suitable polyester polyols include those obtained, for example, from polycarboxylic acids and polyhydric alcohols. A suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, a-hydromuconic acid, β-hydromuconic acid, a-butyl-a-ethyl-glutaric acid, α,β-diethylsuccinic acid, isophthalic acid, therphthalic acid, phthalic acid, hemimellitic acid, and 1,4-cydohexanedicarboxylic acid. A suitable polyhydric alcohol may be used such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, a-methyl glucoside, sucrose, and sorbitol. Also included within the term "polyhydric alcohol" are compounds derived from phenol such as 2,2-bis(4-hydroxyphenyl)-propane, commonly known as Bisphenol A.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether polyol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction produce of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butane-1,4-dithiol; and alkene thiols such as 3-hexene- 1,6-dithiol.

Also suitable are polymer modified polyols, in particular, the so-called graft polyols. Graft polyols are well known to the art and are prepared by the in situ polymerization of one or more vinyl monomers, preferably acrylonitrile and styrene, in the presence of a polyether polyol, particularly polyols containing a minor amount of natural or induced unsaturation. Methods of preparing such graff polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols are also suitable, for example, as those prepared by the reaction of a polyisocyanate with an alkanolamine in the presence of a polyether polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Patent 4,359,541. Other polymer modified polyols may be prepared by the in situ size reduction of polymers until the particle size is less than 20 mm, preferably less than 10 mm.

The average hydroxyl number of the polyols in the polyol composition should be 400 meq polyol/g KOH or more. Individual polyols may be used which fall below the lower limit, but the average should be within this range. Polyol compositions whose polyols are on average within this range make good dimensionally stable foams. In calculating whether the average hydroxyl number is within this range, by definition only those polyols having a number average molecular weight of 200 or more are taken into account.

The mount of additional polyols relative to the a) and b) polyols is not limited. However, I have been able to achieve the desired objectives of solubilizing the cyclopentane in the polyol composition along with manufacturing a dimensionally stable foam having good thermal insulation values, by using 50 weight percent or less of the combined weight of the a) and b) polyols, based on the weight of all polyols.

The invention also includes using at least cyclopentane as a blowing agent. Cyclopentane may be added and solubilized in the polyol composition for storage and later use in a foaming apparatus, or cyclopentane may be added to a preblend tank in the foaming apparatus and solubilized in the polyol composition immediately prior to pumping or metering the foaming ingredients to the mix head. Alternatively, cyclopentane may be added to the foaming ingredients in the mix head as a separate stream, although full solubility might be limited due to the short amount of time the cyclopentane is exposed to the polyol composition in the mix head. The advantage of the polyol composition of the invention is that the polyol composition gives one the flexibility of stably storing polyol compositions containing cyclopentane, or readily solubilizing cyclopentane with the polyol composition in the preblend tank, or, for however short a period of time, adding it at the mix head, to manufacture a foam of the desired quality. We have found that the polyol composition of the invention is specially adapted to enabling cyclopentane to be used as a blowing agent to produce rigid closed cell polyisocyanate based foams meeting the desired objectives.

The amount of cyclopentane used is 7 weight percent or more based on the weight of the polyol composition. The particular amount of cyclopentane, and any other blowing agent used, will depend upon the desired density of the foam product. For most applications, polyurethane free rise densities for thermal insulation applications range from free rise densities of 0.5 to 10 pcf, preferably from 1.2 to 2.5 pcf. The preferred overall densities of foams packed to 10% by weight, meaning the percentage by weight of foam ingredients above the theoretical amount needed to fill the volume of the mold upon foaming, are from about 1.2 to about 2.5 pcf, more preferably from 1.3 to 2.0 pcf. The amount by weight of all blowing agents is generally, based on the polyol composition, from 7 weight percent to 30 weight percent.

The blowing agents which can be used in addition to cyclopentane may be divided into the chemically active blowing agents which chemically react with the isocyanate or with other formulation ingredients to release a gas for foaming, and the physically active blowing agents which are gaseous at the exotherm foaming temperatures or less without the necessity for chemically reacting with the foam ingredients to provide a blowing gas. Included with the meaning of physically active blowing agents are those gases which are thermally unstable and decompose at elevated temperatures.

Examples of chemically active blowing agents are preferentially those which react with the isocyanate to liberate gas, such as $CO_2$. Suitable chemically active blowing agents include, but are not limited to, water, mono- and polycarboxylic acids having a molecular weight of from 46 to 300, salts of these acids, and tertiary alcohols.

Water is preferentially used as a blowing agent. Water reacts with the organic isocyanate to liberate $CO_2$ gas which is the actual blowing agent. However, since water consumes isocyanate groups, an equivalent molar excess of isocyanate must be used to make up for the consumedisocyanates. Water is typically found in minor quantities in the polyols as a byproduct and may be sufficient to provide the desired blowing from a chemically active substance. Preferably, however, water is additionally introduced into the polyol composition in amounts from 0.02 to 5 weight percent, preferably from 0.5 to 3 weight percent, based on the weight of the polyol composition.

The organic carboxylic acids used are advantageously aliphatic mono- and polycarboxylic acids, e.g. dicarboxylic acids. However, other organic mono- and polycarboxylic acids are also suitable. The organic carboxylic acids may, if desired, also contain substituents which are inert under the reaction conditions of the polyisocyanate polyaddition or are reactive with isocyanate, and/or may contain olefinically unsaturated groups. Specific examples of chemically inert substituents are halogen atoms, such as fluorine and/or chlorine, and alkyl, e.g. methyl or ethyl. The substituted organic carboxylic acids expediently contain at least one further group which is reactive toward isocyanates, e.g. a mercapto group, a primary and/or secondary amino group, or preferably a primary and/or secondary hydroxyl group.

Suitable carboxylic acids are thus substituted or unsubstituted monocarboxylic acids, e.g. formic acid, acetic acid, propionic acid, 2-chloropropionic acid, 3-chloropropionic acid, 2,2-dichloropropionic acid, hexanoic acid, 2-ethylhexanoic acid, cyclohexanecarboxylic acid, dodecanoic acid, palmitic acid, stearic acid, oleic acid, 3-mercaptopropionic acid, glycoli acid, 3-hydroxypropionic acid, lactic acid, ricinoleic acid, 2-aminopropionic acid, benzoic acid, 4-methylbenzoic acid, salicylic acid and anthranilic acid, and unsubstituted or substituted polycarboxylic acids, preferably dicarboxylic acids, e.g. oxalic acid, malonic acid, succinic acid, fumaric acid, maleic acid, glutaric acid, adipic acid, sebacic acid, dodecanedoic acid, tartaric acid, phthalic acid, isophthalic acid and citric acid. Preferable acids are formic acid, propionic acid, acetic acid, and 2-ethylhexanoic acid, particularly formic acid.

The amine salts are usually formed using tertiary amines, e.g. triethylamine, dimethylbenzylamine, diethylbenzylamine, triethylenediamine, or hydrazine. Tertiary amine salts of formic acid may be employed as chemically active blowing agents which will react with the organic isocyanate. The salts may be added as such or formed in situ by reaction between any tertiary amine (catalyst or polyol) and formic acid contained in the polyol composition.

Combinations of any of the aforementioned chemically active blowing agents may be employed, such as formic acid, salts of formic acid, and/or water.

Physically active blowing agents are those which boil at the exotherm foaming temperature or less, preferably at 50° C. or less. The most preferred physically active blowing agents are those which have an ozone depletion potential of 0.05 or less. Examples of physically active blowing agents are the volatile non-halogenated hydrocarbons having two to seven carbon atoms such as alkanes, alkenes, cycloalkanes having up to 6 carbon atoms, dialkyl ethers, cycloalkylene ethers and ketones; hydrochlorofluorocarbons (HCFCs); hydrofluorocarbons (HFCs); perfluorinated hydrocarbons (HFCs); fluorinated ethers (HFCs); and decomposition products.

Examples of volatile non-halogenated hydrocarbons include linear or branched alkanes, e.g. butane, isobutane, 2,3 dimethylbutane, n- and isopentane and technical-grade pentane mixtures, n- and isohexanes, n- and isoheptanes, n- and isooctanes, n- and isononanes, n- and isodecanes, n- and isoundecanes, and n- and isododecanes. N-pentane, isopentane or n-hexane, or a mixture thereof are preferably employed as additional blowing agents. Furthermore, specific examples of alkenes are 1-pentene, 2-methylbutene, 3-methylbutene, and 1-hexene, of cycloalkanes in addition to cyclopentane are cyclobutane and cyclohexane, specific examples of linear or cyclic ethers are dimethyl ether, diethyl ether, methyl ethyl ether, vinyl methyl ether, vinyl ethyl ether, divinyl ether, tetrahydrofuran and furan, and specific examples of ketones are acetone, methyl ethyl ketone and cyclopentanone. Pure or technical grade cyclopentane may be used, the latter containing about 70 weight percent cyclopentane with the remainder including 2,3 dimethylbutane, pentane, and isopentane. Mixtures of cyclopentane, pentane, and isopentane as described in U.S. Pat. No. 5,391,317 are also included and incorporated herein by reference.

Any hydrochlorofluorocarbon blowing agent may be used in the present invention. Preferred hydrochlorofluorocarbon blowing agents include 1-chloro-1,2-difluoroethane; 1-chloro-2,2-difluoroethane (142a); 1-chloro-1,1-difluoroethane (142b); 1,1-dichloro-1-fluoroethane (141b); 1-chloro-1,1,2-trifluoroethane; 1-chloro-1,2,2-trifluoroethane; 1,1-diochloro-1,2-difluoroethane; 1-chloro- 1,1,2,2-tetrafluoroethane (124a); 1-chloro-1,2,2,2-tetrafluoroethane (124); 1,1-dichloro-1,2,2-trifluoroethane; 1,1-dichloro-2,2,2-trifluoroethane (123); and 1,2-dichloro-1,1,2-trifluoroethane (123a); monochlorodifluoromethane (HCFC-22); 1-chloro-2,2,2-tdfluoroethane (HCFC-133a); gemchlorofluoroethylene (R-1131a); chloroheptafluoropropane (HCFC-217); chlorodifluoroethylene (HCFC-1122); and trans-chlorofluoroethylene (HCFC-1131). The most preferred hydrochlorofluorocarbon blowing agent is 1,1-dichloro-1-fluoroethane (HCFC-141b).

Suitable hydrofluorocarbons, perfluorinated hydrocarbons, and fluorinated ethers include difluoromethane (HFC-32); 1,1,1,2-tetrafluoroethane (HFC-134a); 1,1,2,2-tetrafluoroethane (HFC-134); 1,1-difluoroethane (HFC-152a); 1,2-difluoroethane (HFC-142), trifluoromethane; heptafluoropropane; 1,1,1-trifluoroethane; 1,1,2-trifluoroethane; 1,1, 1,2,2-pentafluoropropane; 1,1,1,3-tetrafluoropropane; 1,1,2,3,3-pentafluoropropane; 1,1,1,3,3 -pentafluoro-n-butane; hexafluorocyclopropane (C-216); octafluorocyclobutane (C-318); perfluorotetrahydrofuran; perfluoroalkyl tetrahydrofurans; perfluorofuran; perfluoro-propane, -butane, -cyclobutane, -pentane, -cyclopentane, and -hexane, -cyclohexane, -heptane, and -octane; perfluorodiethyl ether; perfluorodipropyl ether; and perfluoroethyl propyl ether.

Decomposition type physically active blowing agents which release a gas through thermal decomposition include pecan flour, amine/carbon dioxide complexes, and alkyl alkanoate compounds, especially methyl and ethyl formates.

Catalysts may be employed which greatly accelerate the reaction of the compounds containing hydroxyl groups and with the modified or unmodified polyisocyanates. Examples of suitable compounds are cure catalysts which also function to shorten tack time, promote green strength, and prevent foam shrinkage. Suitable cure catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X-R^1-Y]_2$, wherein R is a $C_1-C_8$ alkyl or aryl group, $R^1$ is a $C_0-C_{18}$ methylene group optionally substituted or branched with a $C_1-C_4$ alkyl group, Y is hydrogen or an hydroxyl group, preferably hydrogen, X is methylene, an —S—, an —SR$^2$COO—, —SOOC—, an —O$_3$S—, or an —OOC— group wherein $R^2$ is a $C_1-C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1–8C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8C) tin (IV) salts of inorganic compounds such as butyltin trichloride, dimethyl- and diethyl- and dibutyl- and dioctyl- and diphenyltin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1–20C) tin dimercaptides, including dimethyl-, dibutyl-, and dioctyl- tin dimercaptides.

Tertiary amines also promote urethane linkage formation, and include triethylamine, 3-methoxypropyldimethylamine, triethylenediamine, tributylamine, dimethylbenzylamine, N-methyl-, N-ethyl- and N-cyclohexylmorpholine, N,N,N', N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl-4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine and dimethylethanolamine.

To prepare the polyisocyanurate (PIR) and PUR-PIR foams by the process according to the invention, a polyisocyanurate catalyst is employed. Suitable polyisocyanurate catalysts are alkali salts, for example, sodium salts, preferably potassium salts and ammonium salts, of organic carboxylic acids, expediently having from 1 to 8 carbon atoms, preferably 1 or 2 carbon atoms, for example, the salts of formic acid, acetic acid, propionic acid, or octanoic acid, and tris(dialkylaminoethyl)-, tds(dimethylaminopropyl)-, tris-(dimethylaminobutyl)- and the corresponding tris(diethylaminoalkyl)-s-hexahydrotriazines. However, (trimethyl-2-hydroxypropyl)ammonium formate, (trimethyl-2-hydroxypropyl)ammonium octanoate, potassium acetate, potassium formate and tris(dimethylaminopropyl)-s-hexahydrotriazine are polyisocyanurate catalysts which are generally used. The suitable polyisocyanurate catalyst is usually used in an amount of from 1 to 10 parts by weight, preferably from 1.5 to 8 parts by weight, based on 1 00 parts by weight of the total amount of polyols.

Urethane-containing foams may be prepared with or without the use of chain extenders and/or crosslinking agents (c), which are not necessary in this invention to achieve the desired mechanical hardness and dimensional stability. The chain extenders and/or crosslinking agents used have a number average molecular weight of less than 400, preferably from 60 to 300; or if the chain extenders have polyoxyalkylene groups, then having a number average molecular weight of less than 200. Examples are dialkylene glycols and aliphatic, cycloaliphatic and/or araliphatic diols having from 2 to 14 carbon atoms, preferably from 4 to 10 carbon atoms; e.g., ethylene glycol, 1,3-propanediol, 1,10-decanediol, o-, m-, and p-dihydroxycyclohexane, diethylene glycol, dipropylene glycol, and preferably 1,4-butanediol, 1,6-hexanediol, bis(2-hydroxyethyl)hydroquinone, triols such as 1,2,4- and 1,3,5-trihydroxycydohexane, glycerol, and trimethylolpropane.

Polyurethane foams can also be prepared by using secondary aromatic diamines, primary aromatic diamines, 3,3'- di- and/or 3,3'-, 5,5'-tetraalkyl-substituted diarninodiphenylmethanes as chain extenders or crosslinking agents instead of or mixed with the above-mentioned diols and/or triols.

The amount of chain extender, crosslinking agent or mixture thereof used, if any, is expediently from 2 to 20 percent by weight, preferably from 1 to 15 percent by weight, based on the weight of the polyol composition. However, it is preferred that no chain extender/crosslinker is used for the preparation of rigid foams since the polyether polyols described above are sufficient to provide the desired mechanical properties.

If desired, assistants and/or additives can be incorporated into the reaction mixture for the production of the cellular plastics by the polyisocyanate polyaddition process. Specific examples are surfactants, foam stabilizers, cell regulators, fillers, dyes, pigments, flame-proofing agents, hydrolysisprotection agents, and fungistatic and bacteriostatic substances.

Examples of suitable surfactants are compounds which serve to support homogenization of the starting materials and may also regulate the cell structure of the plastics. Specific examples are salts of sulfonic acids, e.g., alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil, and cell regulators, such as paraffins, fatty alcohols, and dimethylpolysiloxanes. The surfactants are usually used in amounts of 0.01 to 5 parts by weight, based on 100 parts by weight of the polyol component.

For the purposes of the invention, fillers are conventional organic and inorganic fillers and reinforcing agents. Specific examples are inorganic fillers, such as silicate minerals, for example, phyllosilicates such as antigorite, serpentine, hom- blends, amphiboles, chrysotile, and talc; metal oxides, such as kaolin, aluminum oxides, titanium oxides and iron oxides; metal salts, such as chalk, barite and inorganic pigments, such as cadmium sulfide, zinc sulfide and glass, inter alia; kaolin (china clay), aluminum silicate and co-precipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of components (the polyol composition and the isocyanate); but the content of mats, nonwovens and wovens made from natural and synthetic fibers may reach values of up to 80 percent by weight.

Examples of suitable flameproofing agents are tricresyl phosphate, tris(2-chloroethyl) phosphate, tris(2-chloropropyl) phosphate, and tris(2,3-dibromopropyl) phosphate.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 50 pans by weight, preferably from 5 to 25 parts by weight, of said flameproofing agents may be used per 100 pans by weight of the polyol composition.

Further details on the other conventional assistants and additives mentioned above can be obtained from the specialist literature, for example, from the monograph by J. H. Saunders and K. C. Frisch, High Polymers, Volume XVI, Polyurethanes, Parts 1 and 2, Interscience Publishers 1962 and 1964, respectively, or Kunststoff-Handbuch, Polyurethane, Volume VII, Carl-Hanser-Vefiag, Munich, Vienna, 1st and 2nd Editions, 1966 and 1983.

Suitable organic polyisocyanates, defined as having 2 or more isocyanate functionalities, are conventional aliphatic, cycloaliphatic, araliphatic and preferably aromatic isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'-2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates (crude MDD, as well as mixtures of crude MDI and toluene diisocyanates. The organic di- and polyisocyanates can be used individually or in the form of mixtures. Particularly preferred for the production of rigid foams is crude MDI containing about 50 to 70 weight percent polyphenylpolymethylene polyisocyanate and from 30 to 50 weight percent diphenylmethane diisocyanate, based on the weight of all polyisocyanates used.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or- triols. Prepolymers containing NCO groups with an NCO content of 29 to 3.5 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

The organic isocyanates used in the invention preferably have an average functionality of greater than 2, most preferably 2.5 or more. This provide for a greater crosslinking density in the resulting foam, which improves the dimensional stability of the foam.

To produce the rigid closed cell polyurethane foams, the organic polyisocyanate and the isocyanate reactive compounds are reacted in such amounts that the isocyanate index, defined as the number of equivalents of NCO groups divided by the total number of isocyanate reactive hydrogen atom equivalents multiplied by 100, ranges from 80 to less than 150, preferably from 90 to 110. I have found that the polyol composition of the invention affords one the flexibility of a large processing window in that the solubility of the polyol composition and the dimensional stability and thermal insulation of the resulting foam are substantially unaffected throughout a wide range of isocyanate indices. If the rigid foams contain, at least in part, bonded isocyanurate groups, an isocyanate index of 150 to 6000, preferably from 200 to 800, is usually used.

In a method of the invention, there is provided the reaction of an organic isocyanate with a polyol composition containing at least:

a) an aromatic amine initiated polyoxyalkylene polyether polyol having an hydroxyl number of 200 meq polyol/g KOH or more;

b) an aliphatic amine initiated polyoxyalkylene polyether polyol having an hydroxyl number of 200 meq polyol/g KOH or more in an amount of 10 weight percent or less based on the weight of the polyol composition; and c) cyclopentane;

wherein the cyclopentane is dissolved in the polyol composition. In this embodiment, the polyol composition contains cyclopentane in solution prior to reaction with the organic isocyanate. Preferably, the organic isocyanate and the polyol composition are reacted at isocyanate indices ranging from 80 to 115. All throughout this range the K-factors of the foam are substantially constant and the foams are dimensionally stable. A substantially constant K-factor value means that the variance in values is ±10 percent or less between the lowest and highest values within the range. Throughout the range, the foam also remains dimensionally stable as defined below. The measurements for the K-factor are taken from core samples as described below in the definition of a dimensionally stable foam and are the initial K-factors.

The rigid foams made from polyisocyanate polyaddition products are advantageously produced by the one-shot process, for example, using reaction injection moldings, or the high pressure or low pressure method, in an open or closed mold, for example, in a metallic mold, or in a pour-in-place application where the surfaces contacting the reaction mixture become a part of the finished article.

The starting components may be mixed at from 15° to 90° C., preferably at from 20° to 35° C., and introduced into the open or closed mold, if desired under super-atmospheric pressure. The mixing of the isocyanate with the polyol composition containing dissolved cyclopentane can be carried out mechanically by means of a stirrer or a stirring screw or under high pressure by the impingement injection method. The mold temperature is expediently from 20° to 110° C., preferably from 30° to 60° C., in particular from 45° to 50° C.

The rigid foams produced by the process according to the invention and the corresponding structural foams are used, for example, in the vehicle industry-the automotive, aircraft, and shipbuilding industries—and in the furniture and sports goods industries. They are particularly suitable in the construction and refrigeration sectors as thermal insulators, for example, as intermediate layers for laminate board or for foam-filling refrigerators, freezer housings, and picnic coolers.

For pour-in-place applications, the rigid foam may be poured or injected to form a sandwich structure of a first substrate/foam/second substrate or may be laminated over a substrate to form a substrate foam structure. The first and second substrate may each be independently made of the same material or of different materials, depending upon the end use. Suitable substrate materials comprise metal such as aluminum, tin, or formed sheet metal such as used in the case of refrigeration cabinets; wood, including composite wood; acrylonitrile-butadiene-styrene (ABS) triblock of rubber, optionally modified with styrene-butadiene diblock, styrene-ethylene/butylene-styrene triblock, optionally functionalized with maleic anhydride and/or maleic acid, polyethylene terephthalate, polycarbonate, polyacetals, rubber modified high impact polystyrene (HIPS), blends of HIPS with polyphenylene oxide, copolymers of ethylene and vinyl acetate, ethylene and acrylic acid, ethylene and vinyl alcohol, homopolymers or copolymers of ethylene and propylene such as polypropylene, high density polyethylene, high molecular weight high density polyethylene, polyvinyl chloride, nylon 66, or amorphous thermoplastic polyesters. Preferred are aluminum, tin, ABS, HIPS, polyethylene, and high density polyethylene.

The polyurethane foam may be contiguous to and bonded to the inner surfaces of the first and second substrates, or the polyurethane foam may be contiguous to a layer or lamina of synthetic material interposed between the substrates. Thus, the sequence of layers in the composite may also comprise a first substrate/polyurethane foam/layer or lamina/second substrate or first substrate/layer or lamina/polyurethane foam/layer or lamina/second substrate.

The layer or lamina of layers additionally interposed into the composite may comprise any one of the above-mentioned synthetic resins which have good elongation such as low density polyethylene or low density linear polyethylene as a stress relief layer or a material which promotes adhesion between the polyurethane foam and the first and/or second substrate of choice.

When a synthetic plastic material such as polyethylene having few or no bonding or adhesion sites is chosen as the first and/or second substrate as an alternative to an adhesion-promoting layer, it is useful to first modify the substrate surface with a corona discharge or with a flame treatment to improve adhesion to the polyurethane foam.

During the foam-in-place operation, the substrates are fixed apart in a spaced relationship to define a cavity between the first substrate and second substrate, and optionally the inner surface of at least one substrate, preferably both, treated to promote adhesion. This cavity is then filled with a liquid polyurethane system which reacts and foams in situ, bonding to the inner surfaces of the first and second substrates. In the case of a refrigeration unit or a cooler container, such as a picnic cooler, a thermoformed inner liner material is inserted into the outer shell of cooler or the refrigeration cabinet, in a nested spaced relationship to define a cavity, which cavity is then filled with a foamed-in-place polyurethane foam. In many cases, it is only the polyurethane foam which holds together the outer shell and inner liner, underscoring the need for foam dimensional stability.

The polyurethane cellular products of the invention are rigid, meaning that the ratio of tensile strength to compressive strength is high, on the order of 0.5:1 or greater, and having less than 10 percent elongation. The foams are also closed cell, meaning that the number of open cells is 20% or less, or conversely the number of closed cells is 80% or greater, the measurement being taken on a molded foam packed at 10% over the theoretical amount required to fill the mold with foam.

The rigid polyurethane cellular products of the invention are dimensionally stable, exhibiting little or no shrinkage, even at free rise densities of 2.0 pcf or less. In a preferred embodiment, the rigid polyurethane cellular products of the invention tested according to ASTM D 2126-87 using core samples of density 2.0 pcf or less with dimensions of 3"×3"×1" and taken from a 10% packed boxes measuring 4"×10"×10" advantageously have the following dimensional changes at seven (7) days of exposure: at 158° F./100 percent RH no more than ±5 percent, more preferably no more than ±3 percent; at 200° F./0.0 percent RH no more than ±5 percent, most preferably less than ±4 percent; at −20° F. no more than ±5 percent, preferably no more than ±3 percent.

The thermal insulation values of the rigid closed cell foams according to the preferable embodiments of the invention are 0.160 BTU-in./hr.-ft$^2$-F or less initial, more preferably 0.150 or less initial, measured from the core of a 10% overpacked sample. It has been found that foams made with the combination of aliphatic and aromatic amine initiated polyether polyols exhibited lower k-factors than foams made with a replacement amount of the aliphatic amine initiated polyether polyol. Furthermore, cyclopentane is only sparingly soluble in polyol compositions tested which employ a replacement amount of aliphatic amine initiated polyether polyol.

In a preferable embodiment, the rigid polyurethane foams are also advantageously not friable at their surface in spite of their low density and the presence of polyols having a high hydroxyl number and low equivalent weight. These foams exhibit a surface friability of less than 5 percent when tested according to ASTM C 421, at core densities of 2.0 pcf or less, even at core densities of 1.5 pcf or less. The low surface friability enables the foam to adhere well to substrates.

By the term polyisocyanate based foam as used herein is also meant to include polyurethane-polyurea, polyurethane-polyisocyanurate, polyurethane, and polyisocyanurate foams.

| WORKING EXAMPLES | |
|---|---|
| Polyol A | is a sucrose-dipropylene glycol co-initiated polyoxypropylene polyether polyol having a nominal OH number of about 397. |
| Polyol B | is a polyoxyethylene-polyoxypropylene polyether polyol co-initiated with about 90 percent vicinal toluenediamine and about 10 percent ethylenediamine, based on the weight of the initiators, the polyol being terminated with about 68 weight percent oxypropylene groups based on the weight of all oxyalkylene groups, and having a nominal OH number of about 500. |
| Polyol C | is a monoethanolamine initiated polyoxypropylene-polyoxyethylene polyol terminated with about 32 weight percent oxyethylene groups based on the weight of oxyalkylene groups, and having a nominal OH number of about 500. |
| Polyol D | is a polyoxyethylene-polyoxypropylene polyol initiated with vicinal toluenediamine and terminated with about 61 weight percent oxypropylene groups based on the weight of all oxyethylene groups, and having a nominal OH number of about 390. |
| Polyol E | is an aliphatic amine initiated propylene oxide-ethylene oxide adduct commercially available from BASF AG, having an OH of about 114. |
| TEGOSTAB ® B-8404 | is a silicone surfactant commercially available from Goldschmidt. |
| L-6900 | is a silicone surfactant commercially available from OSi. |
| POLYCAT ® 5 | is pentamethyl-diethylenetriamine, a catalyst used in the preparation of rigid foams, commercially available from Air Products. |
| DMCHA | is dimethylcyclohexylamine, commercially available from BASF Corporation. |
| FOMREZ UL-1 | is dibutyltin dimercaptide available from Air Products. |
| ISO A | is polymethylene polyphenylene polyisocyanate having an free NCO content of 31.8 percent and a functionality of approximately 2.7. |

EXAMPLE 1

The amounts of 60 parts by weight of Polyol A, 40 parts by weight of Polyol B, 3 parts by weight of L-6900, 0.9 parts by weight of POLYCAT 5, 0.8 parts by weight of DMCHA, 0.1 parts by weight of UL-1, and 2 parts by weight of water were blended together in a paper cup. To this mixture was added technical grade liquid cyclopentane containing about 70 percent cyclopentane available from Phillips, in an amount of 14 parts by weight. The mixture was again stirred for 60 seconds. The cyclopentane was completely soluble in the polyol composition. After allowing the mixture to stand still overnight without agitation, the cyclopentane remained soluble in the polyol composition without any visually detectable phase separation. After five (5) days of letting the mixture stand still without agitation, there was no visually observable evidence of phase separation. This confirmed that the polyol composition was storage stable and that the cyclopentane dissolved and remained in solution.

A second batch of a polyol composition using the same ingredients in the same amounts as noted above was mixed into a 1.5 gallon steel tank and attached to an Edge-Sweets® high pressure impingement mix machine. An amount of 147.23 parts by weight of ISO A in the isocyanate tank attached to the machine was impingement mixed with 120.50 parts by weight of the polyol composition. The machine parameters were calibrated as follows:

| | |
|---|---|
| Resin (g) | 103.4 |
| Isocyanate (g) | 127.1 |
| Pump RPMS (r) | 21.90 |
| Pump RPMS (I) | 21.00 |
| Weight for Three-Second Shots (g) | 230.5 |
| Pump Psig | 2000 |
| Grams/Second | 63.13 |
| Total Net Weight in Cup (g) | 252.50 |
| Resin Weight/Second | 34.47 |
| Isocyanate Weight/Second. | 42.37 |

The foaming ingredients were shot from the machine into a # 10 Lilly cup and allowed to free rise. The density was measured at 1.95 pcf, and the initial K-factor was measured according to ASTM C518 at 0.136 btu in. $ft^{2\circ}$ F.

COMPARATIVE EXAMPLE 1

The same foam formulation and procedure used to make the polyurethane foam in Example 1 above was used to make the Comparative Example foam, except that Polyol B was replaced by 40 parts by weight of Polyol D, which is a pure aliphatic amine-initiated polyether polyol. Cyclopentane was only sparingly soluble in the polyol composition in this example. After one day of standing still, phase separation between cyclopentane and the polyol composition was visually evident. Upon agitation, cyclopentane formed only an emulsion in the polyol composition. The resulting foam product had a free rise density of 1.6 pcf and an initial K-factor of 0.150 btu/in/$ft^{2\circ}$ F.

The results indicate that the use of both an aromatic and an aliphatic amine-initiated polyether polyol surprisingly solubilized the cyclopentane in the polyol composition. In the comparison example, we expected that an increase in the aliphatic amine-initiated content would further enhance the solubility of cyclopentane in the polyol composition, but this was not so. Furthermore, it was quite surprising that less than 10 weight percent on a calculated basis of the aliphatic amine-initiated polyether polyol, and in particular, about 3.3 weight percent on a calculated basis as used in Example 1 above, was necessary to effect total solubility of cyclopentane in the polyol composition.

EXAMPLE 2

In this example, the thermal conductivities and dimensional stability of the polyurethane foams made at different isocyanate indices was measured. In each of the examples, the foaming ingredients were dispensed from an Edge-Sweets® high pressure foam machine. Samples 1–3 were run at an isocyanate index of 80, Samples 4–6 were run at an isocyanate index of 90, Samples 7–9 were run at an isocyanate index of 100, and Samples 10–12 were run at an isocyanate index of 110. In each grouping, a free rise sample was taken and measured for an initial thermal conductivity. Furthermore, the thermal conductivity and other physical properties of the foams within each grouping were measured at different densities. The polyisocyanate composition and the amount of Isocyanate A is reported below in Table 1 along with the machine calibrations. Both free rise samples and foams made at 10 percent overpacking in cake boxes were measured for their thermal conductivities, with the 10 percent overpacked samples also measured for compressive strengths, friability, and dimensional stability. Those results are reported in Table 2 below.

The results indicate that foams made at isocyanate indices as low as 80 possessed good thermal insulation and were dimensionally stable. Furthermore, in each of these examples, cyclopentane was soluble in the polyol composition.

TABLE 1

| SAMPLE | 1 | 2 | 3 | 4 | 5 | 6 | 7 | 8 | 9 | 10 | 11 | 12 |
|---|---|---|---|---|---|---|---|---|---|---|---|---|
| POLYOL A | 60 | 60 | 60 | 60 | 60 | 60 | 60 | 60 | 60 | 60 | 60 | 60 |
| POLYOL B | 40 | 40 | 40 | 40 | 40 | 40 | 40 | 40 | 40 | 40 | 40 | 40 |
| B-8404 | 5.0 | 5.0 | 5.0 | 5.0 | 5.0 | 5.0 | 5.0 | 5.0 | 5.0 | 5.0 | 5.0 | 5.0 |
| POLYCAT 5 | 0.90 | 0.90 | 0.90 | 0.90 | 0.90 | 0.90 | 0.90 | 0.90 | 0.90 | 0.90 | 0.90 | 0.90 |
| DMCHA | 0.60 | 0.60 | 0.60 | 0.60 | 0.60 | 0.60 | 0.60 | 0.60 | 0.60 | 0.60 | 0.60 | 0.60 |
| WATER | 2.0 | 2.0 | 2.0 | 2.0 | 2.0 | 2.0 | 2.0 | 2.0 | 2.0 | 2.0 | 2.0 | 2.0 |
| CYCLOPENTANE* | 14.0 | 14.0 | 14.0 | 14.0 | 14.0 | 14.0 | 14.0 | 14.0 | 14.0 | 14.0 | 14.0 | 14.0 |
| TOTAL | 122.50 | 122.50 | 122.50 | 122.50 | 122.50 | 122.50 | 122.50 | 122.50 | 122.50 | 122.50 | 122.50 | 122.50 |
| ISO A | 107.07 | 107.07 | 107.07 | 120.46 | 120.46 | 120.46 | 133.84 | 133.84 | 133.84 | 147.23 | 147.23 | 147.23 |
| INDEX | 80 | 80 | 80 | 90 | 90 | 90 | 100 | 100 | 100 | 110 | 110 | 110 |
| MACHINE PARAMETERS | | | | | | | | | | | | |
| RESIN (g) | 142.1 | 142.1 | 142.1 | 126.0 | 126.0 | 126.0 | 114.3 | 114.3 | 114.3 | 104.9 | 104.9 | 104.9 |
| ISO (g) | 124.1 | 124.1 | 124.1 | 124.0 | 124.0 | 124.0 | 125.3 | 125.3 | 125.3 | 125.5 | 125.5 | 125.5 |
| PUMP RPMS (r) | 30.9 | 30.9 | 30.9 | 27.10 | 27.10 | 27.10 | 24.3 | 24.3 | 24.3 | 22.00 | 22.00 | 22.00 |
| PUMP RPMS (i) | 24.7 | 24.7 | 24.7 | 24.7 | 24.7 | 24.7 | 24.7 | 24.7 | 24.7 | 24.7 | 24.7 | 24.7 |
| PUMP PSIG | 2000 | 2000 | 2000 | 2000 | 2000 | 2000 | 2000 | 2000 | 2000 | 2000 | 2000 | 2000 |
| GRAMS/SEC. | 86.63 | 86.63 | 86.63 | 76.43 | 76.43 | 76.43 | 72.72 | 72.72 | 72.72 | 69.57 | 69.57 | 69.57 |
| MIX TIME F.R. (sec.) | 3.0 | — | — | 3.5 | — | — | 3.50 | — | — | 3.50 | — | — |

TABLE 1-continued

| SAMPLE | 1 | 2 | 3 | 4 | 5 | 6 | 7 | 8 | 9 | 10 | 11 | 12 |
|---|---|---|---|---|---|---|---|---|---|---|---|---|
| DENSITY, F.R. (pcf) | 1.45 | — | — | 1.55 | — | — | 1.64 | — | — | 1.74 | — | — |
| INITIAL K-FACTOR (but/in/hr.ft.$^2$ °F.) | 0.152 | — | — | 0.153 | — | — | 0.153 | — | — | 0.151 | — | — |
| MIX TIME, PACKED (fcc) | 2.11 | 2.29 | 2.49 | 2.46 | 2.68 | 2.90 | 2.80 | 3.05 | 3.30 | 3.20 | 3.48 | 3.77 |
| DENSITY, PACKED (pcf) | 1.73 | 1.87 | 2.02 | 1.86 | 2.01 | 2.17 | 1.99 | 2.16 | 2.33 | 2.15 | 2.33 | 2.52 |
| PERCENT, PACKED | 10 | 20 | 30 | 10 | 20 | 30 | 10 | 20 | 30 | 10 | 20 | 30 |
| RATIO RESIN/ISO | 1.1450 | 1.1450 | 1.1450 | 1.0201 | 1.0201 | 1.0201 | 0.9122 | 0.9122 | 0.9122 | 0.8359 | 0.8359 | 0.8359 |

*70 percent purity

TABLE 2

| SAMPLE | 1 | 2 | 3 | 4 | 5 | 6 | 7 | 8 | 9 | 10 | 11 | 12 |
|---|---|---|---|---|---|---|---|---|---|---|---|---|
| DENSITY CORE (pcf) | 1.49 | 1.54 | 1.67 | 1.60 | 1.71 | 1.79 | 1.89 | 2.01 | 2.01 | 1.89 | 2.03 | 2.3 |
| COMPRESSIVE STRENGTH | | | | | | | | | | | | |
| 10% Defl. Parl. (psi) | 24.9 | 27.2 | 26.2 | 29.9 | 29.9 | 29.4 | 32.0 | 34.5 | 34.2 | 36.4 | 36.2 | 35.4 |
| Yield Pt (psi) | 29.1 | 31.0 | 31.4 | 32.1 | 34.5 | 34.0 | 34.6 | 37.7 | 38.1 | 39.3 | 39.7 | 40.0 |
| % Defl. at Yield Pt | 6.1 | 5.8 | 6.0 | 4.9 | 5.9 | 5.7 | 7.1 | 6.0 | 6.5 | 6.8 | 6.8 | 7.0 |
| Modulus (psi) | 577.0 | 604.2 | 605.8 | 679.4 | 661.2 | 674.5 | 693.3 | 734.9 | 731.3 | 798.1 | 766.9 | 767.3 |
| K-FACTOR (btu-in./hr. ft$^2$ °F. | | | | | | | | | | | | |
| Initial | 0.146 | 0.146 | 0.148 | 0.146 | 0.145 | 0.148 | 0.150 | 0.151 | 0.153 | 0.152 | 0.152 | 0.156 |
| 10 days at 140 F. | 0.166 | 0.161 | 0.163 | 0.160 | 0.158 | 0.162 | 0.157 | 0.160 | 0.161 | 0.158 | 0.158 | 0.164 |
| 30 days at 140 F. | 0.174 | 0.170 | 0.171 | 0.169 | 0.167 | 0.171 | 0.175 | 0.175 | 0.178 | 0.178 | 0.177 | 0.180 |
| FRIABILITY PERCENT (WT. LOSS) | 2.41 | 2.85 | 3.82 | 2.97 | 4.23 | 5.04 | 2.76 | 3.43 | 3.25 | 3.14 | 3.93 | 2.61 |
| SSC (PERCENT VOL. CHANGE) | | | | | | | | | | | | |
| 100 F., 100% R.H. | | | | | | | | | | | | |
| 1 DAY | -1.7 | 0.7 | -0.3 | 0.2 | 0.8 | 1.6 | -0.6 | 0.5 | 0.6 | -0.8 | -0.8 | -0.2 |
| 2 DAYS | -5.1 | 0.4 | -0.8 | 0.2 | 0.7 | 1.2 | -0.7 | 0.0 | 1.5 | -1.4 | 0.4 | 0.7 |
| 7 DAYS | -8.3 | 0.6 | -2.0 | -0.5 | -0.2 | -0.3 | 0.9 | 1.0 | 1.6 | -0.4 | 0.8 | 1.2 |
| 14 DAYS | -7.6 | 2.5 | 0.0 | 0.2 | 0.8 | 1.4 | 0.6 | 0.8 | 1.0 | 0.1 | 0.1 | 0.9 |
| 28 DAYS | -4.8 | 3.3 | 0.5 | 1.5 | 1.3 | 2.1 | 1.5 | 1.5 | 2.0 | 1.0 | 1.4 | 2.1 |
| 158 F., 100% R.H. | | | | | | | | | | | | |
| 1 DAY | 0.0 | 1.4 | 1.4 | 0.9 | 1.0 | 1.1 | 0.7 | 1.0 | 0.3 | 0.6 | 1.2 | -0.1 |
| 2 DAYS | -0.2 | 0.7 | 1.3 | 1.1 | 1.1 | 1.4 | 0.9 | 1.4 | 1.4 | 0.9 | 1.0 | -0.1 |
| 7 DAYS | 0.4 | 0.8 | 2.3 | 0.8 | 0.8 | 1.6 | 1.8 | 1.4 | 1.5 | 1.2 | 1.6 | 1.1 |
| 14 DAYS | 3.3 | 2.8 | 5.2 | 1.0 | 1.3 | 1.7 | 1.7 | 1.8 | 1.3 | 0.6 | 1.8 | 0.4 |
| 28 DAYS | 6.0 | 5.3 | 6.8 | 2.9 | 2.5 | 2.6 | 3.3 | 2.8 | 1.4 | 2.1 | 2.6 | 1.9 |
| 158 F. DRY HEAT | | | | | | | | | | | | |
| 1 DAY | 0.1 | -0.5 | -1.0 | 0.2 | 0.0 | -0.1 | -0.3 | -0.1 | -0.2 | -1.1 | -0.5 | -0.2 |
| 2 DAYS | 0.1 | -0.3 | -0.9 | -0.1 | -0.2 | 0.2 | 0.0 | 0.2 | -0.3 | -0.6 | -0.5 | -0.5 |
| 7 DAYS | 0.7 | -0.2 | -0.2 | -0.1 | 0.2 | -0.1 | 1.4 | 1.6 | 1.1 | 0.8 | 0.7 | 0.6 |
| 14 DAYS | 0.5 | -0.2 | -0.7 | 0.4 | 0.1 | 0.1 | 1.7 | 0.6 | 0.2 | 0.7 | 2.0 | -0.1 |
| 28 DAYS | 1.7 | 1.2 | 0.4 | 1.4 | 1.3 | 0.2 | 1.9 | 1.7 | 0.6 | 0.9 | 1.1 | 0.3 |
| 200 F., DRY HEAT | | | | | | | | | | | | |
| 1 DAY | -1.5 | -0.7 | -1.4 | -0.5 | 0.0 | -0.30 | -2.1 | -0.8 | -0.7 | -0.2 | -1.0 | -1.0 |
| 2 DAYS | 0.2 | -0.3 | -1.3 | -0.4 | -0.2 | 0.1 | -2.1 | -0.8 | -0.7 | 0.0 | -0.4 | -0.6 |
| 7 DAYS | 3.9 | 3.6 | 0.8 | 2.3 | 0.8 | 2.9 | 0.1 | 0.9 | 0.8 | 1.5 | 0.9 | 0.5 |
| 14 DAYS | 6.2 | 4.8 | 2.6 | 0.9 | 0.6 | 1.0 | 1.0 | 6.8 | 1.0 | 2.5 | 1.6 | 1.0 |
| 28 DAYS | 9.3 | 8.3 | 5.7 | 1.6 | 0.7 | 1.3 | 1.5 | 0.8 | 1.3 | 2.3 | 1.9 | 0.5 |
| -20 F., DRY HEAT | | | | | | | | | | | | |
| 1 DAY | 0.3 | -0.6 | -0.4 | -0.3 | 0.1 | 0.1 | -0.6 | -0.1 | -0.7 | -0.1 | 1.7 | 0.2 |
| 2 DAYS | -0.3 | -0.2 | 0.0 | 0.8 | 0.2 | 0.2 | -0.2 | -0.5 | -0.6 | -0.4 | -0.5 | -0.3 |
| 7 DAYS | -1.3 | 0.3 | -0.4 | -0.7 | -0.3 | -0.2 | 0.4 | 0.3 | -0.1 | 0.3 | 1.2 | 0.7 |

The results above indicate that the initial K-factor for free rise foams was substantially the same at isocyanate indices ranging from 80–110. The thermal conductivity of core samples taken at 10 percent packed foams also did not change substantially with a change in isocyanate index. As the density increased, the thermal conductivity also tended to slightly increase. However, the changes in thermal conductivity between foams with equivalent densities at different isocyanate indices were sufficiently close to allow for wide processing latitude without sacrificing the dimensional stability of the foam. Friability of the polyurethane foam was about five percent or less at isocyanate indices ranging from 80–110 through a wide range of densities. Furthermore, the initial thermal conductivity of the polyurethane foam did not vary by more than ±0.01 b.t.u.-in./hr-ft$^{2o}$ F. throughout the isocyanate index range of from 80 to 110. In the more preferred embodiment at isocyanate indices ranging from 90 to 110, the low SSC values reveal that the polyurethane foams were very dimensionally stable throughout a wide range of densities.

EXAMPLE 3

In this example, the thermal conductivity and dimensional stability of foams poured into 15-quart Igloo Playmate picnic coolers was measured. The same procedure was employed as in Example 2, except that the ingredients, their amounts, and the machine parameters differed according to the data set forth in Table 3 below. The technique used to pour the foam into the 15-quart Igloo Playmate picnic coolers is as follows:

First, the cooler bodies and inserts were flame treated. The cooler mold fixture was then heated to 110° F. The cooler bodies and inserts were placed into the fixture, and the minimum fill weight was determined. The coolers were produced at 10, 15, and 20 percent overpacked. Once poured, the picnic coolers were allowed to cure in the heated fixture for two (2) minutes. Once removed, the coolers were tested as previously discussed. The K-factors were determined from the packed box samples made with an identical foam system on the same day. The results are reported in Table 4 below.

TABLE 3

| SAMPLE | 13 | 14 | 15 |
|---|---|---|---|
| POLYOL A | 60 | 60 | 60 |
| POLYOL B | 40 | 40 | 40 |
| L-6900 | 3.0 | 3.0 | 3.0 |
| POLYCAT 5 | 0.90 | 0.90 | 0.90 |
| DMCHA | 0.60 | 0.60 | 0.60 |
| WATER | 2.0 | 2.0 | 2.0 |
| CYCLOPENTANE | 14.0 | 14.0 | 14.0 |
| TOTAL | 120.50 | 120.50 | 120.50 |
| ISO A | 147.23 | 147.23 | 147.23 |
| INDEX | 110 | 110 | 110 |
| MACHINE PARAMETERS | | | |
| RESIN (g) | 103.9 | 103.9 | 103.9 |
| ISO (g) | 127.1 | 127.1 | 127.1 |
| PUMP RPMS (r) | 738 | 738 | 738 |
| PUMP RPMS (i) | 750 | 750 | 750 |
| PUMP PSIG | 2000 | 2000 | 2000 |
| GRAMS/SEC. | 75.2 | 75.2 | 75.2 |
| SHOT TIME(s) | 3.47 | 3.70 | 3.81 |
| WT. (g) | 266.7 | 283.8 | 292.7 |
| % PACKING | 10 | 15 | 20 |
| MOLD TEMP. F., OUT/IN SIDE | 130/110 | 128/106 | 128/107 |
| COOLER INSERT TEMP, F. | 110 | 106 | 107 |
| DEMOLD (min) | 2 | 2 | 2 |

TABLE 4

| SAMPLE | 1 | 2 | 3 |
|---|---|---|---|
| DENSITY CORE (pcf) | 1.91 | 1.75 | 1.84 |
| COMPRESSIVE STRENGTH | | | |
| 10% Defl. Per. (psi) | 30.6 | 33.2 | 36.2 |
| Yield Pt (psi) | 31.9 | 34.2 | 36.5 |
| % Defl. at Yield | 6.4 | 6.0 | 6.5 |
| Pt Modulus (psi) | 590.1 | 769.0 | 790.9 |
| FRIABILITY PERCENT (WT. LOSS) | 5.99 | 6.96 | 5.23 |
| Porosity (% uncorrected) | 93.99 | 95.48 | 95.66 |
| SSC (PERCENT VOL. CHANGE) | | | |
| 100 F., 100% R.H. | | | |
| 1 DAY | −0.3 | 0.6 | 0.9 |
| 2 DAYS | −2.7 | 0.2 | 0.4 |
| 7 DAYS | −4.6 | 0.1 | 1.1 |
| 14 DAYS | −4.5 | 0.1 | 0.3 |
| 158 F., 100% R.H. | | | |
| 1 DAY | 1.7 | 1.8 | 1.7 |
| 2 DAYS | 0.9 | 1.6 | 1.5 |
| 7 DAYS | 1.5 | 0.7 | 0.9 |
| 14 DAYS | 3.2 | 1.6 | 1.4 |
| 158 F., DRY HEAT | | | |
| 1 DAY | −0.8 | −0.4 | −1.2 |
| 2 DAYS | −0.8 | −0.4 | −0.7 |
| 7 DAYS | 0.0 | −0.1 | −1.1 |
| 14 DAYS | 0.8 | 0.9 | −0.8 |
| 200 F., DRY HEAT | | | |
| 1 DAY | 0.7 | −0.5 | −1.7 |
| 2 DAYS | 2.0 | 1.0 | −1.2 |
| 7 DAYS | 4.0 | 5.3 | −0.7 |
| 14 DAYS | 3.5 | 7.6 | 0.4 |
| −20 F., DRY HEAT | | | |
| 1 DAY | −0.6 | 0.2 | −0.1 |
| 2 DAYS | −0.8 | 0.2 | −0.9 |
| 7 DAYS | −0.4 | 0.7 | 0.5 |

The results of the measurements taken from polyurethane foams poured into the 15-quart Igloo Playmate coolers indicate that the foams remained dimensionally stable throughout the simulated service conditions. The foam also exhibited good initial k-factor and little change in the aged k-factor.

EXAMPLE 4

In this example, polyurethane foams were made using a combination of separately manufactured aromatic amine initiated polyols and aliphatic amine initiated polyols, which were subsequently mixed together. The same mix procedure was used as in Example 2, except the kinds and amounts of ingredients used, as well as the machine settings, differed according to the data presented in Table 5 below. The results are reported in Table 6 below.

TABLE 5

| SAMPLE | 16 | 17 | 18 |
|---|---|---|---|
| POLYOL A | 60 | 60 | 60 |
| POLYOL C | 36 | 36 | 36 |
| POLYOL D | 4.00 | 4.00 | 4.00 |
| B-8404 | 3.00 | 3.00 | 3.00 |
| POLYCAT 5 | 1.20 | 1.20 | 1.20 |
| DMCHA | 0.80 | 0.80 | 0.80 |
| WATER | 2.00 | 2.00 | 2.00 |
| CYCLOPENTANE | 12.00 | 12.00 | 12.00 |
| TOTAL | 119.00 | 119.00 | 119.00 |
| ISO A | 136.87 | 136.87 | 136.87 |

TABLE 5-continued

| SAMPLE | 16 | 17 | 18 |
|---|---|---|---|
| INDEX | 110 | 110 | 110 |
| MACHINE PARAMETERS | | | |
| RESIN (g) | 109.90 | 109.90 | 109.90 |
| ISO (g) | 125.90 | 125.90 | 125.90 |
| PUMP RPMS (r) | 780.00 | 780.00 | 780.00 |
| PUMP RPMS (i) | 750.00 | 750.00 | 750.00 |
| PUMP PSIG | 2000 | 2000 | 2000 |
| GRAMS/SEC. | 78.23 | 78.23 | 78.23 |
| MIX TIME F.R. (sec.) | 3.50 | 3.50 | 3.50 |
| DENSITY, F.R. (pcf) | 1.60 | 1.60 | 1.60 |
| INITIAL K-FACTOR (but/in/hr. ft.$^2$ °F.) | 0.158 | 0.159 | 0.160 |
| MIX TIME, PACKED (fcc) | 2.50 | 2.75 | 3.01 |
| DENSITY, PACKED (pcf) | 1.92 | 2.10 | 2.28 |
| PERCENT, PACKED | 10 | 20 | 30 |
| RATIO RESIN/ISO | 0.8729 | 0.8729 | 0.8729 |

TABLE 6

| SAMPLE | 1 | 2 | 3 |
|---|---|---|---|
| DENSITY CORE (pcf) | 1.77 | 1.89 | 2.04 |
| COMPRESSIVE | | | |
| 10% Defl | 24.0 | 25.4 | 36.6 |
| Yield Pt (psi) | 27.9 | 29.0 | 29.3 |
| % Defl at Yield Pt | 6.7 | 6.9 | 7.6 |
| Modulus (psi) | 606.5 | 602.2 | 547.7 |
| K-FACTOR (btu-in/hr ft$^2$ °F. | | | |
| Initial | 0.158 | 0.159 | 0.160 |
| 10 days at 140 F. | 0.196 | 0.202 | 0.202 |
| FRIABILITY PERCENT | 9.16 | 9.41 | 10.01 |
| POROSITY | 86.29 | 89.15 | 89.46 |
| POROSITY CORRECTED | 99.16 | 100.00 | 100.00 |
| SSC (PERCENT VOL. | | | |
| 100 F. 100% R.H. | | | |
| 1 DAY | 0.6 | 0.8 | 1.3 |
| 2 DAYS | 0.0 | −0.1 | 0.8 |
| 7 DAYS | 0.1 | 0.7 | 0.9 |
| 14 DAYS | 1.7 | 1.9 | 1.9 |
| 158 F. 100% R.H. | | | |
| 1 DAY | 0.9 | 0.3 | 0.7 |
| 2 DAYS | 1.3 | 0.4 | 1.0 |
| 7 DAYS | 2.0 | 0.3 | 1.1 |
| 14 DAYS | 0.5 | 1.9 | 0.1 |
| 200 F. DRY HEAT | | | |
| 1 DAY | 0.4 | 0.3 | −0.1 |
| 2 DAYS | −0.1 | 0.3 | −0.8 |
| 7 DAYS | 0.1 | 0.3 | −1.1 |
| 14 DAYS | −0.2 | 0.2 | −1.5 |
| −20 F. DRY HEAT | | | |
| 1 DAY | −0.3 | 0.0 | 0.3 |
| 2 DAYS | −0.6 | 0.0 | −0.1 |
| 7 DAYS | −0.1 | 0.2 | 0.5 |

The polyol compositions in samples 16–18 were tested for cyclopentane solubility. After letting the polyol composition containing cyclopentane at 14 pbw stand still for five (5) days, no visual evidence of phase separation was detectable. Thus, cyclopentane dissolved also in polyol compositions containing a mixture of separately manufactured aromatic amine initiated polyols and aliphatic amine initiated polyols. The foams manufactured from the polyol compositions were each dimensionally stable as shown by the extremely low volume variances.

What we claim is:

1. A storage stable polyol composition comprising:
   a) an aromatic amine initiated polyoxyalkylene polyether polyol having an hydroxyl number of 200 meq polyol/g KOH or more;
   b) an aliphatic amine initiated polyoxyalkylene polyether polyol having an hydroxyl number of 200 meq polyol/g KOH or more in an amount of 10 weight percent or less based on the weight of the polyol composition; and
   c) cyclopentane;
   wherein the cyclopentane is dissolved in the polyol composition.

2. The composition of 1, wherein the amount of cyclopentane is 7 weight percent or more based on the weight of the polyol composition.

3. The composition of claim 2, wherein said a) and b) polyols together comprise polyols obtained by co-initiating said aromatic amine and said aliphatic amine with an alkylene oxide.

4. The composition of claim 3, wherein said polyol composition further comprises an hydroxyl functional polyoxyalkylene polyether polyol having a nominal functionality of 5 or more.

5. The composition of claim 4, wherein the average hydroxyl number of the polyols in the polyol composition is 400 meq polyol/g KOH or more.

6. The composition of claim 5, wherein the amount of said a) and b) polyols is 50 weight percent or less based on the weight of all polyols in the polyol composition having a number average molecular weight of 200 or more.

7. The composition of claim 6, wherein the weight ratio of aromatic initiated amine to aliphatic initiated amine polyols is 4:1 or greater.

8. The composition of claim 7, wherein said weight ratio is from 7:1 to 11:1.

9. The composition of claim 3, wherein each of said a) and b) polyols contain 50 weight percent or more of polyoxypropylene groups based on the weight of all oxyalkylene groups.

10. The composition of claim 1, wherein said polyol composition further comprises water in an amount of from 0.05 to 4 weight percent.

11. The composition of claim 1, wherein said polyol composition further comprises an hydroxyl functional polyoxyalkylene polyether polyol having a nominal functionality of 5 or more.

12. The composition of claim 1, wherein the average hydroxyl number of all polyols having a number average molecular weight of 200 or more is 400 meq polyol/g KOH.

13. The composition of claim 1, wherein the amount of said a) and b) polyols is 50 weight percent or less based on the weight of all polyols in the polyol composition having a number average molecular weight of 200 or more.

14. The composition of claim 1, wherein the weight ratio of aromatic initiated amine to aliphatic initiated amine is 4:1 or greater.

15. The composition of claim 13, wherein said weight ratio is from 7:1 to 11:1.

16. The composition of claim 1, wherein said a) and b) polyols contain 50 weight percent or more of polyoxypropylene groups based on the weight of all oxyalkylene groups employed in the manufacture of said a) and b) polyols.

* * * * *